M. C. A. LATOUR & J. BETHENOD.
MACHINE FOR TRANSFORMING THE FREQUENCY OF CURRENTS.
APPLICATION FILED FEB. 20, 1914.
1,271,915.
Patented July 9, 1918.
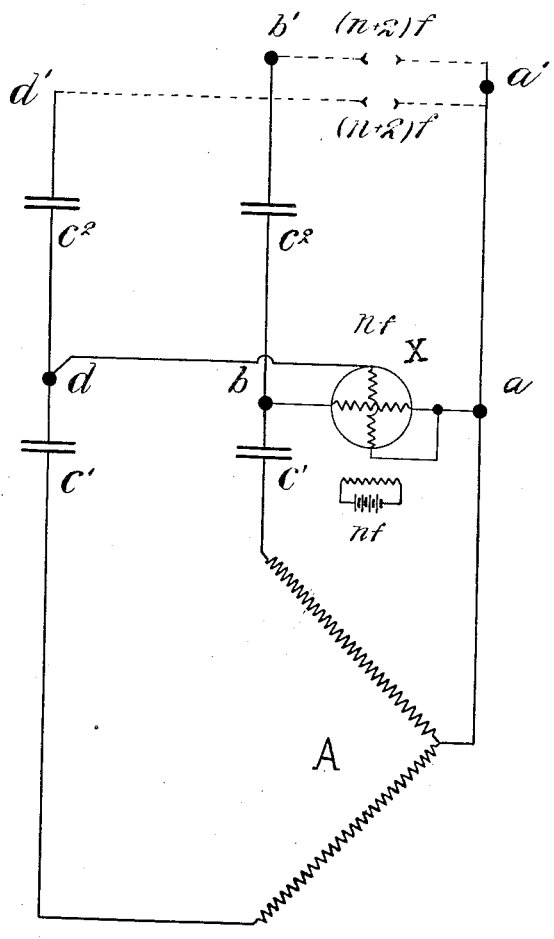

UNITED STATES PATENT OFFICE.

MARIUS C. A. LATOUR AND JOSEPH BETHENOD, OF PARIS, FRANCE.

MACHINE FOR TRANSFORMING THE FREQUENCY OF CURRENTS.

1,271,915.      Specification of Letters Patent.      Patented July 9, 1918.

Application filed February 20, 1914. Serial No. 820,088.

*To all whom it may concern:*

Be it known that we, MARIUS C. A. LATOUR and JOSEPH BETHENOD, engineers, residing in Paris, France, 10 Rue Auber, Paris, have invented new and useful Improvements in Machines for Transforming the Frequency of Currents.

This invention relates to apparatus for transforming polyphase currents of $nf$ cycles into polyphase currents of $(n+2)f$ cycles by means of a single transformation, $n$ being any entire number whatever and $f$ indicating the proper frequency of the machine used for the transformation.

It is known that in the case of the usual alternator the frequency corresponds to the revolutions per second multiplied with the number of pole pairs of the alternator. The alternator used in the present invention comprises a rotor with a single-phase winding which is short-circuited and a stator with a two-phase winding. In the accompanying drawing the alternator and its connections are diagrammatically indicated. In the drawing B designates the rotor and A the stator.

It is assumed that the terminals $a$, $b$, $d$ are connected to any source X furnishing two-phase currents of the frequency $nf$. (The condensers $c'$ indicated in the drawing have the purpose of suppressing or counterbalancing the self induction of the windings to the frequency $nf$.) These two-phase currents of the frequency $nf$ generate a field rotating with the velocity $nf$. Consequently, when the rotor turns, with the angular velocity $$\frac{f}{2\pi}$$

and in the opposite direction to the rotating field, a current of the frequency of $(n+1)f$ is induced in its winding. This single phase current generates an alternating field which may be resolved in two rotating fields rotating in opposite directions at a velocity of $(n+1)f$ with respect to the rotor. One of the two resolved fields rotates with respect to the stator at a velocity of $$(n+1)f - f = nf,$$

and combines its action in the usual manner with the stator field of the frequency $nf$, while the other of the two fields rotates at a velocity of $$(n+1)f + f = (n+2)f.$$

and induces consequently in the windings of the stator at the terminals $a'$, $b'$, $d'$ currents of the frequency $(n+2)f$ after the condensers $c^2$ which, combined with the condensers $c^1$, suppress the self induction of the stator windings at the frequency $(n+2)f$. In this manner, while from the outside source currents of the frequency $nf$ are introduced at the terminals $a$, $b$, and $d$, currents of the higher frequency $(n+2)f$ are obtained at the terminals $a'$, $b'$, $d'$. Naturally these currents of the frequency $(n+2)f$ may again be transformed into currents of the frequency $(n+4)f$, etc.

While in the present invention reference is made to two-phase currents it is understood that any polyphase current may be employed.

We claim:

A machine for transforming currents of lower frequency and currents of higher frequency for wireless telegraphy and telephony, comprising in combination a stator with a polyphase winding, a rotor with a single phase winding, condensers connected to the stator and adapted to insure resonance of the circuit for the receiving current of the machine, and additional condensers connected to the stator and in series to said first named condensers and adapted to insure resonance of the circuit for the current generated by the machine, substantially as described.

In testimony whereof we affix our signatures in presence of two witnesses.

MARIUS C. A. LATOUR.
    JOSEPH BETHENOD.

Witnesses:
    CHAS. P. PRESSLY,
    EUGENE VERTANEN.